United States Patent
Zou et al.

(10) Patent No.: US 10,324,872 B2
(45) Date of Patent: Jun. 18, 2019

(54) INTERRUPT-VECTOR TRANSLATION LOOKASIDE BUFFER

(71) Applicant: Intel IP Corporation, Santa Clara, CA (US)

(72) Inventors: Xiang Zou, Hillsboro, OR (US); Hong Wang, Santa Clara, CA (US); Gautham N. Chinya, Hillsboro, OR (US); Perry H. Wang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 172 days.

(21) Appl. No.: 15/270,726

(22) Filed: Sep. 20, 2016

(65) Prior Publication Data

US 2018/0081835 A1 Mar. 22, 2018

(51) Int. Cl.
*G06F 13/24* (2006.01)
*G06F 12/1009* (2016.01)
*G06F 12/1027* (2016.01)

(52) U.S. Cl.
CPC .......... *G06F 13/24* (2013.01); *G06F 12/1009* (2013.01); *G06F 12/1027* (2013.01); *G06F 2212/657* (2013.01); *G06F 2212/68* (2013.01)

(58) Field of Classification Search
CPC ... G06F 13/24; G06F 12/1009; G06F 12/1027
See application file for complete search history.

(56) References Cited

U.S. PATENT DOCUMENTS

| | | | |
|---|---|---|---|
| 5,924,127 A | 7/1999 | Kawamoto et al. | |
| 6,175,898 B1 * | 1/2001 | Ahmed | G06F 9/383 711/137 |
| 6,378,023 B1 * | 4/2002 | Christie | G06F 12/0875 710/260 |
| 2002/0069328 A1 * | 6/2002 | Chauvel | G06F 1/3203 711/130 |
| 2005/0060461 A1 * | 3/2005 | Yang | G06F 13/24 710/260 |
| 2006/0123172 A1 * | 6/2006 | Herrell | G06F 13/24 710/269 |
| 2008/0140956 A1 | 6/2008 | Hass et al. | |

(Continued)

OTHER PUBLICATIONS

International Search Report and Written Opinion for Application No. PCT/US2017/045854, dated Nov. 17, 2017, 18 pages.

*Primary Examiner* — Farley Abad
*Assistant Examiner* — Henry W Yu
(74) *Attorney, Agent, or Firm* — Nicholson De Vos Webster & Elliott, LLP (57) ABSTRACT

Systems, Methods and apparatuses relating to processor cores that respond to interrupts are disclosed. In one embodiment, an apparatus includes an interrupt interface, a memory interface; and a processor core to generate an interrupt acknowledge signal in response to a received interrupt; receive data in return; determine whether the received data is an interrupt service routine address, the interrupt service routine address being stored in an interrupt vector translation lookaside buffer; and, if not, use the received data to calculate the interrupt service routine address; wherein the processor core is further to use the interrupt service routine address to issue a request on the memory interface to fetch the interrupt service routine, and to execute the interrupt service routine.

17 Claims, 10 Drawing Sheets

(56) References Cited

U.S. PATENT DOCUMENTS

2014/0115297 A1* 4/2014 Cain, III ............. G06F 12/1027
                                                    711/207
2014/0195709 A1   7/2014 Coleman et al.

* cited by examiner

INTERRUPT-VECTOR TRANSLATION LOOKASIDE BUFFER

TECHNICAL FIELD

Embodiments described herein generally relate to processors that respond to interrupts. In particular, embodiments described generally relate to an Interrupt-Vector Translation Lookaside Buffer (IVTLB).

In computing, interrupts are events that indicate that a condition exists somewhere in the system, the processor, or within the currently executing program or task that requires the attention of a processor. Many computing applications, including desktop and mobile computing, and also embedded processors used, for example, for motor control or audio processing benefit from processors that exhibit low interrupt response latencies. A processor with a low interrupt latency may also be useful in various Internet of Things applications that require low latency responses.

One measure of "interrupt latency" of a processor core is the number of clock cycles required for the processor to respond to an interrupt request, which is typically measured based on the number of clock cycles between an assertion of an interrupt request up to a cycle where a first instruction of an interrupt handler executes.

The action taken by a processor in response to an interrupt typically calls for loading and running an Interrupt Service Routine. Conventional processor cores that receive an interrupt expend many cycles to calculate the address of the Interrupt Service Routine for any particular interrupt, a process that can involves fetching and analyzing various processor registers and, potentially, memory locations.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed herein are embodiments to reduce interrupt latency within a processing subsystem.

Figure 1:
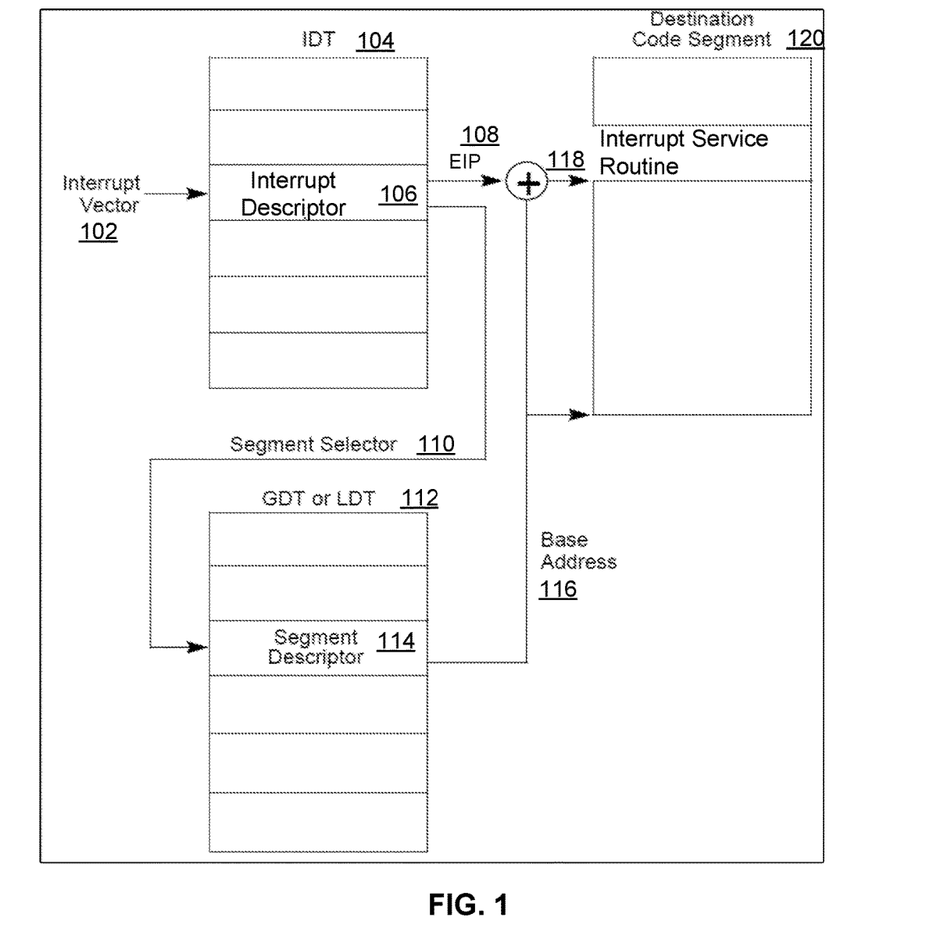
FIG. 1 is a block diagram illustrating an addressing scheme for determining the address for an Interrupt Service Routine according to one embodiment.

FIG. 1 is a block diagram illustrating an addressing scheme for determining the address of an Interrupt Service Routine according to one embodiment. According to one embodiment, interrupt vector 102 is used to select an interrupt descriptor 106 from Interrupt Descriptor Table 104, wherein the interrupt descriptor includes an extended instruction pointer (EIP) 108 and a segment selector 110, which is used to select a segment descriptor 114 from Global Descriptor Table or Local Descriptor Table 112, the segment descriptor including a base address 116 for destination code segment 120. The interrupt service routine address 118 can be computed using EIP 108 and base address 116. The addressing scheme of FIG. 1 can be implemented and exercised by a processor, a processor core, including processors that implement functions using microcode, or a finite state machine. Unfortunately, parts of the process of calculating the interrupt service routine can be slower and require many cycles. Detailed below are processing subsystems, systems, methods, and apparatuses to reduce the time to calculate the interrupt service routine address, and to thereby reduce interrupt latency.

Figure 2:
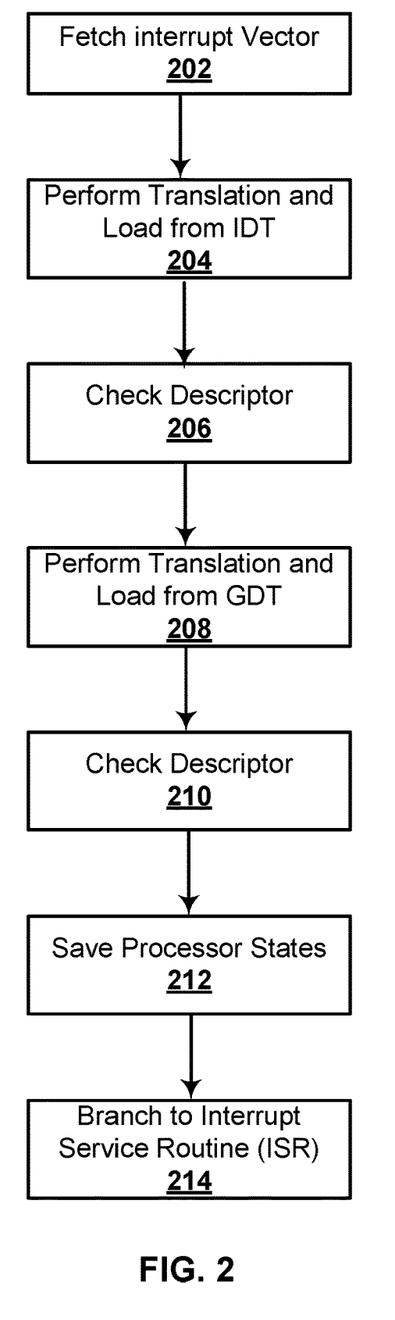
FIG. 2 is a block flow diagram illustrating a procedure for determining an address for an Interrupt Service Routine according to one embodiment.

FIG. 2 is a block diagram illustrating a procedure for determining the address for an Interrupt Service Routine according to one embodiment. As with the flow illustrated in FIG. 1, the flow illustrated in FIG. 2 fetches an interrupt vector at 202, performs translation and load from an interrupt descriptor table, 204, checks the validity of a descriptor at 206, performs translation and load from a global descriptor table at 208, and checks the validity of a descriptor at 210. At this point in the flow, the interrupt service routine can be and is calculated (not shown). The flow of FIG. 2 saves processor core states at 212, and branches to the interrupt service routine (ISR) at 214. The block flow diagram of FIG. 2 can be implemented and exercised by a processor, a processor core, including processors that implement functions using microcode, or a finite state machine. Unfortunately, parts of the flow of FIG. 1, including accessing the IDT and GDT at 204 to 210, can be slower and require many cycles. Detailed below are processing subsystems, systems, methods, and apparatuses to reduce the time to calculate the interrupt service routine address, and to thereby reduce interrupt latency.

Figure 3:
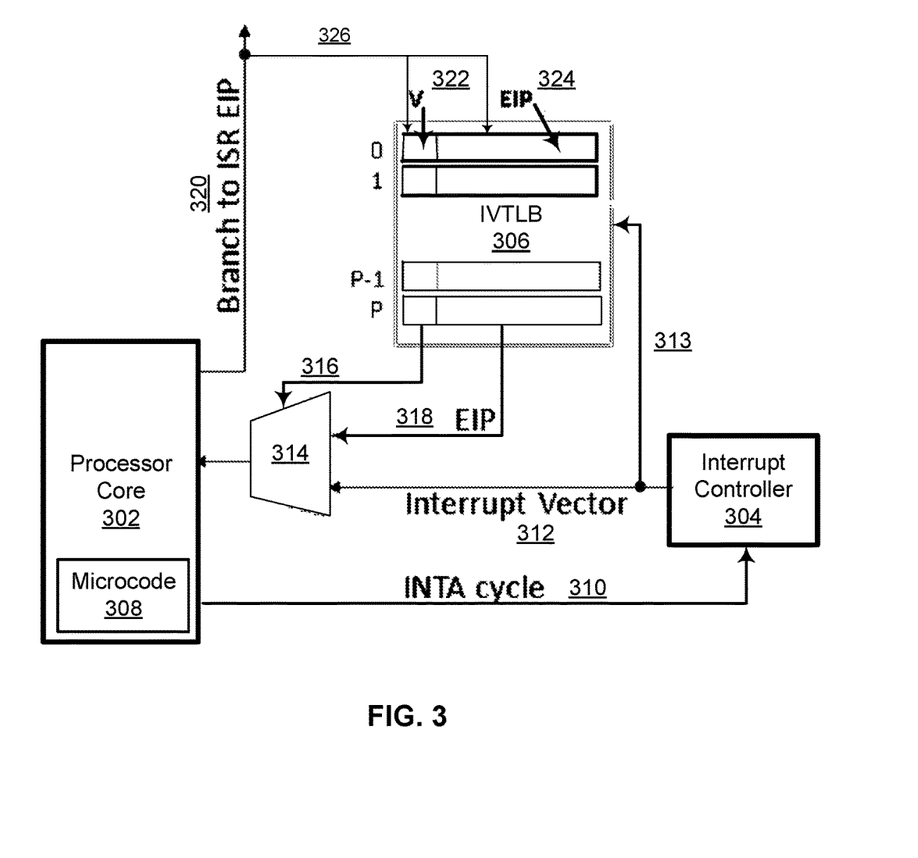
FIG. 3 is a block diagram illustrating components to receive and service an interrupt according to one embodiment.

FIG. 3 is a block diagram illustrating components to receive and service an interrupt according to one embodiment. In one embodiment, processor core 302, having received an interrupt, acknowledges receipt of the interrupt by asserting INTA 310. Interrupt controller 304, in response to INTA 310, transmits an interrupt vector 312 associated with the pending interrupt, to processor core 302 through selector 314. At this point, as with the flows illustrated in FIG. 1 and FIG. 2, processor core 302 must take time to use the received interrupt vector to perform translations, load from the IDT and GDT, and check the descriptors, before determining the address for the interrupt service routine.

The block diagram of FIG. 3, however, stores the interrupt service routine pointer in an interrupt vector translation lookaside buffer 306 (IVTLB), so that the next time it receives the same interrupt, it can service the interrupt with a stored address, rather than to recalculate one, thereby reducing the average interrupt latency. In particular, IVTLB 306 has P+1 rows, having addresses of 0 to P, with one entry for each of P+1 interrupts. In one embodiment, each row of IVTLB 306 is associated with a different interrupt number and includes at least a row valid bit 322 and an extended instruction pointer (EIP) 324 of an interrupt service routine. In alternate embodiments, IVTLB 306 may have more rows than the number of interrupts, or fewer rows than the number of interrupts. After power-on or reset, the row valid bit 322 for every row is set to invalid, for example, 0. In one embodiment, processor core 302, after receiving interrupt vector 312 and calculating interrupt service routine EIP 320, writes the EIP 326 to the IVTLB row associated with that interrupt, and sets the valid bit.

The next time that processor core 302 receives the same interrupt, it will receive and use the EIP 324 from the IVTLB, rather than to recalculate EIP. In particular, interrupt controller 304, when routing interrupt vector 312 to the processor core 302, will also route the interrupt number to IVTLB 306, selecting the row of the interrupt being serviced. In this embodiment, the IVTLB row of the selected interrupt has a row valid bit 322 set to 1, which will control selector 314 to deliver the stored EIP 318 to the processor, rather than the interrupt vector 312. Processor core 302, in turn, can analyze the received data to determine whether it is an interrupt vector or an EIP address: if there are $2^N$ interrupts and the received data is M bits, processor core 302 determines that the received data is an interrupt vector if bits M−N are equal to zero, and bits N−1 to 0 represent the interrupt number. If processor core 302 services interrupts using the stored EIP 318 rather than recalculating one, it will exhibit a lower interrupt latency.

In one embodiment, processor core 302 includes a microcode ROM 308 or other medium that stores microcode, and processor core 302 fetches and executes microcode stored in the microcode ROM 308. In other embodiments, processor core 302 uses a finite state machine to perform its functions. In a further embodiment, processor core 302 stores instructions in a static or dynamic SRAM.

In an alternate embodiment, if IVTLB 306 contains valid entries and the contents of the Interrupt Descriptor Table or Global Descriptor Table are modified, the contents of IVTLB 306 must be invalidated. In particular, processor core 302 must execute a Load Interrupt descriptor table instruction or Load Global descriptor table instruction to invalidate the IVTLB 306 memory. Furthermore, in such a situation, valid entries will be loaded into IVTLB 306 while servicing subsequent interrupts.

Similarly, in an alternate embodiment, if IVTLB 306 contains valid entries and the contents CS register are modified, the contents of IVTLB 306 must be invalidated. In particular, processor core 302 must execute a Load Interrupt descriptor table instruction or Load Global descriptor table instruction to invalidate the IVTLB 306 memory. Furthermore, in such a situation, valid entries will be loaded into IVTLB 306 while servicing subsequent interrupts.

In an alternate embodiment, limitations are placed on acceptable address for an interrupt service routine. For example, the interrupt service routine may be excluded from the lowest 256 bytes of memory.

In one embodiment, interrupt controller 304 includes an interrupt interface to connect to processor core 302; and an execution circuit to receive an interrupt acknowledgement from processor core 302 associated with an interrupt number, and to send an interrupt vector to processor core 302 corresponding to the interrupt number, and, at the same time, send the interrupt number to a read port 313 of IVTLB 306.

Figure 4:
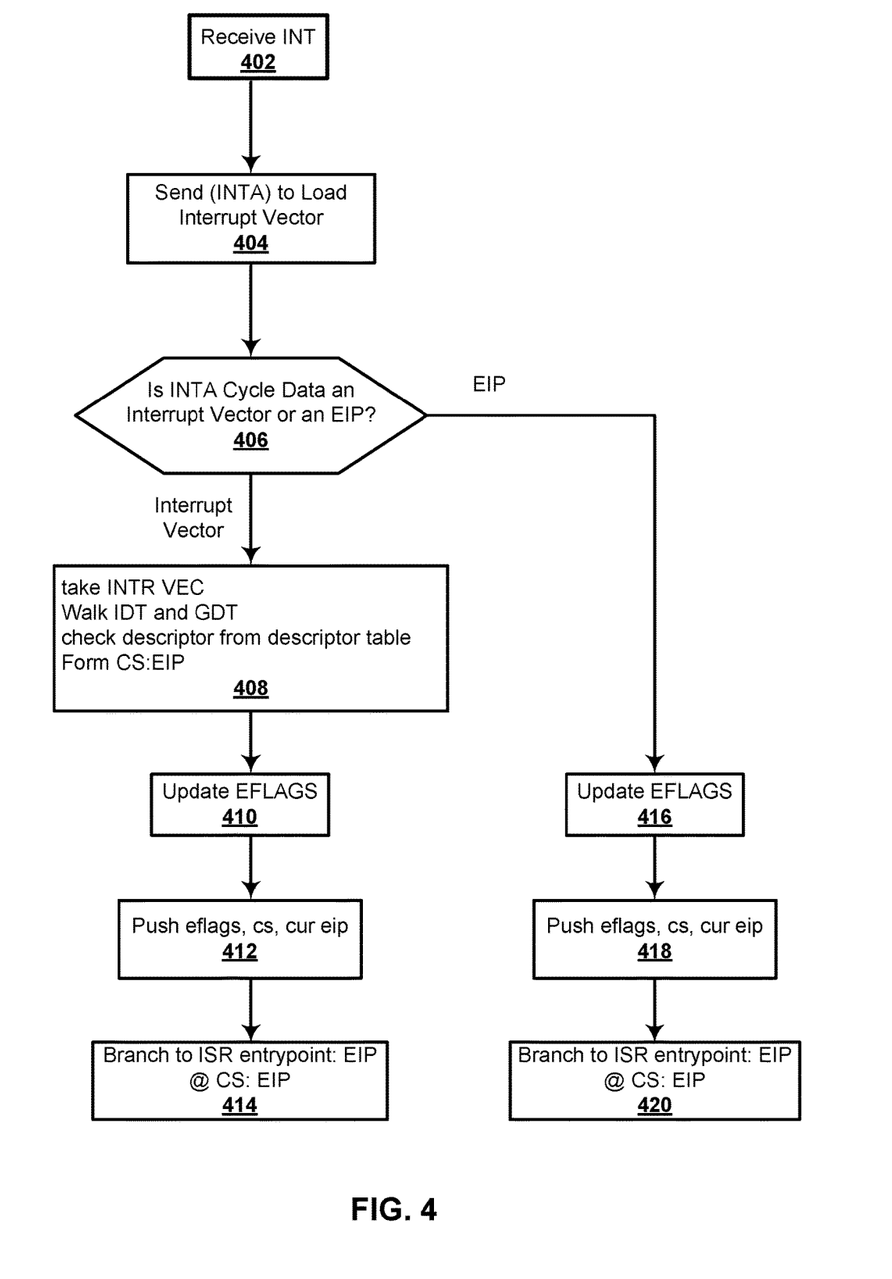
FIG. 4 is a flow diagram illustrating an instruction flow to receive and service an interrupt according to one embodiment.

FIG. 4 illustrates an embodiment of a method for servicing an interrupt. In an embodiment, microcode of the processor core perform the activities of the method: namely, to receive an interrupt at 402, to send an INTA acknowledgement at 404, and, in response, to receive INTA Cycle data at 406, and to test whether the INTA cycle data is an interrupt vector, meaning that the extended instruction pointer (EIP) needs to be computed, or whether the INTA cycle data is an extended instruction pointer (EIP), meaning that it was stored in the IVTLB and need not be recalculated, allowing the Interrupt Service Routine to be executed sooner.

If the processor core determines at 406 that the INTA data received at 404 is an interrupt vector, it must take time to determine the extended instruction pointer (EIP) at 408 because the interrupt vector does not contain the extended instruction pointer (EIP). To do so, the processor core must use the interrupt vector to walk the Interrupt Descriptor Table and the Global Descriptor Table, to check the descriptor from the descriptor table, and to form the address of the Interrupt Service Routine, CS: EIP, by adding the code segment register and the extended instruction pointer, EIP. The 408 process is similar to the process illustrated in FIG. 1.

If the processor core determines at 406, however, that the INTA data received at 404 is an EIP, it can avoid having to spend the time determining the EIP. The processor core updates the EFLAGS at 416, pushes EFLAGS, CS, Current EIP at 418, and branches at 420 to ISR entry point using EIP. Avoiding the updates that would be required, such as at 408, yields a lower interrupt latency because the processor core can start the ISR more quickly.

In one embodiment, the flow 200 and the circuit 300 comprise a processor core that executes microcode and microinstructions. In an alternate embodiment, flow 200 and circuit 300 comprise a full-custom processor or ASIC configured to perform the operations. In an alternate embodiment, flow 200 and circuit 300 comprise an embedded processor. In an alternate embodiment, flow 200 and circuit 300 comprise a processor for use with a Real-Time Operating System (RTOS). In an alternate embodiment, flow 200 and circuit 300 comprise an embedded processor being used by an Internet of Things application or product.

Figure 5:
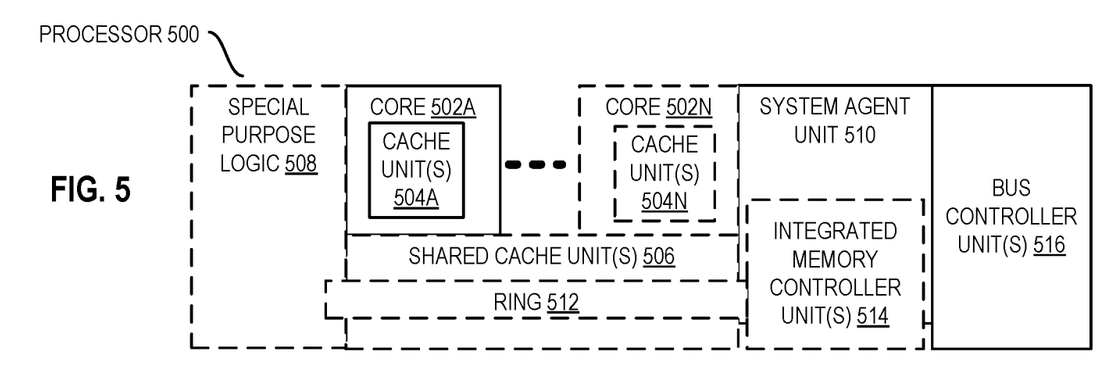
FIG. 5 is a block diagram of a processor 500 that may have more than one core, may have an integrated memory controller, and may have integrated graphics according to embodiments.

FIG. 5 is a block diagram of a processor 500 that may have more than one core, may have an integrated memory controller, and may have integrated graphics according to embodiments. The solid lined boxes in FIG. 5 illustrate a processor 500 with a single core 502A, a system agent 510, a set of one or more bus controller units 516, while the optional addition of the dashed lined boxes illustrates an alternative processor with multiple cores 502A-N, a set of one or more integrated memory controller unit(s) 514 in the system agent 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of one or more integrated memory controller units 514. The set of one or more shared cache units 506 may include one or more mid-level caches, such as level 2 (L2), level 3 (L3), level 4 (L4), or other levels of cache, a last level cache (LLC), and/or combinations thereof. In alternate embodiments, the memory hierarchy may include a tightly coupled memory (TCM) to provide low latency, predictable access to instructions or data, such as an interrupt service routine. While in one embodiment a ring based interconnect unit 512 interconnects the integrated graphics logic 508 (integrated graphics logic 508 is an example of and is also referred to herein as special purpose logic), the set of one or more shared cache units 506, and the system agent 510/integrated memory controller unit(s) 514, alternative embodiments may use any number of well-known techniques for interconnecting such units. In one embodiment, coherency is maintained between the set of one or more shared cache units 506 and cores 502-A-N.

In some embodiments, one or more of the cores 502A-N are capable of multi-threading. The system agent 510 includes those components coordinating and operating cores 502A-N. The system agent 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Figure 6:
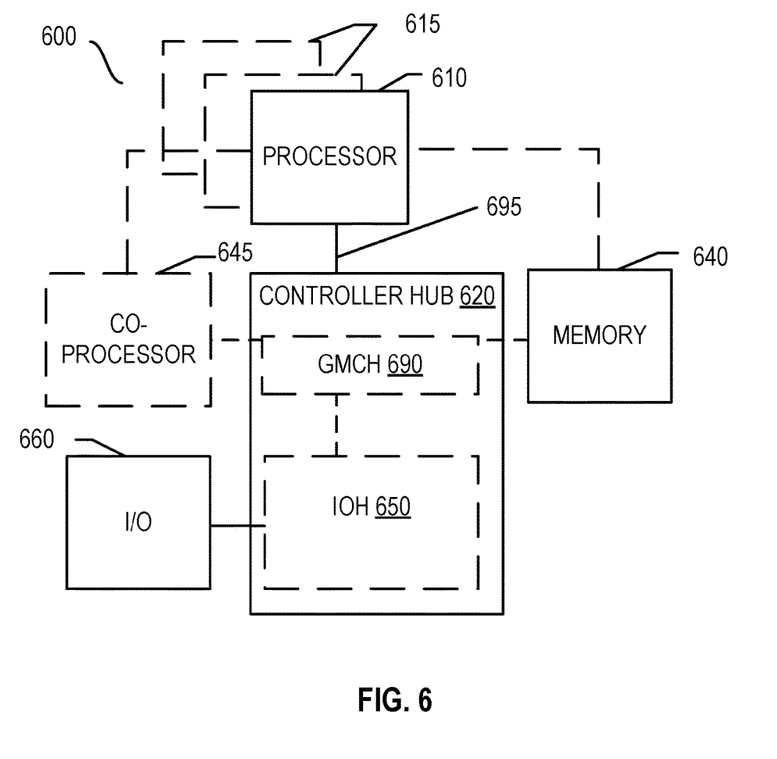
FIG. 6 shows a block diagram of a system 600 in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processor cores described herein and may be some version of the processor 610.

The memory 640 may be, for example, dynamic random access memory (DRAM), phase change memory (PCM), static random access memory (SRAM), FLASH memory, or a combination thereof. For at least one embodiment, the controller hub 620 communicates with the processors 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the processors 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
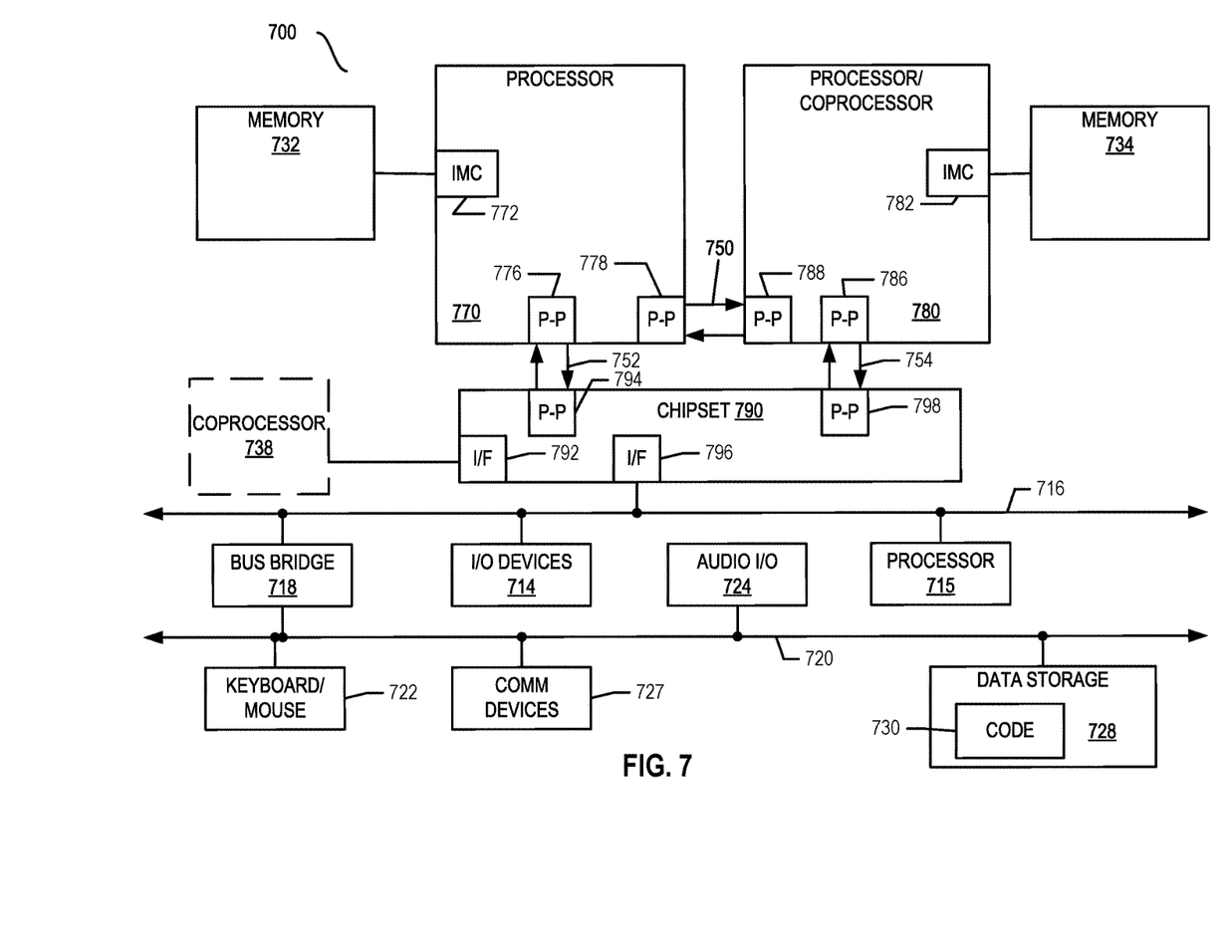
FIG. 7 shows a block diagram of a first more specific exemplary system 700 in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, first and second processors 770 and 780 are respectively processors 610 and 615, while coprocessor 738 is coprocessor 645. In another embodiment, first and second processors 770 and 780 are respectively processor 610 coprocessor 645.

First and second processors 770 and 780 are shown including integrated memory controller (IMC) units 772 and 782, respectively. First Processor 770 also includes as part of its bus controller units point-to-point (P-P) interfaces 776 and 778; similarly, second processor 780 includes P-P interfaces 786 and 788. First and second Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

First and second processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
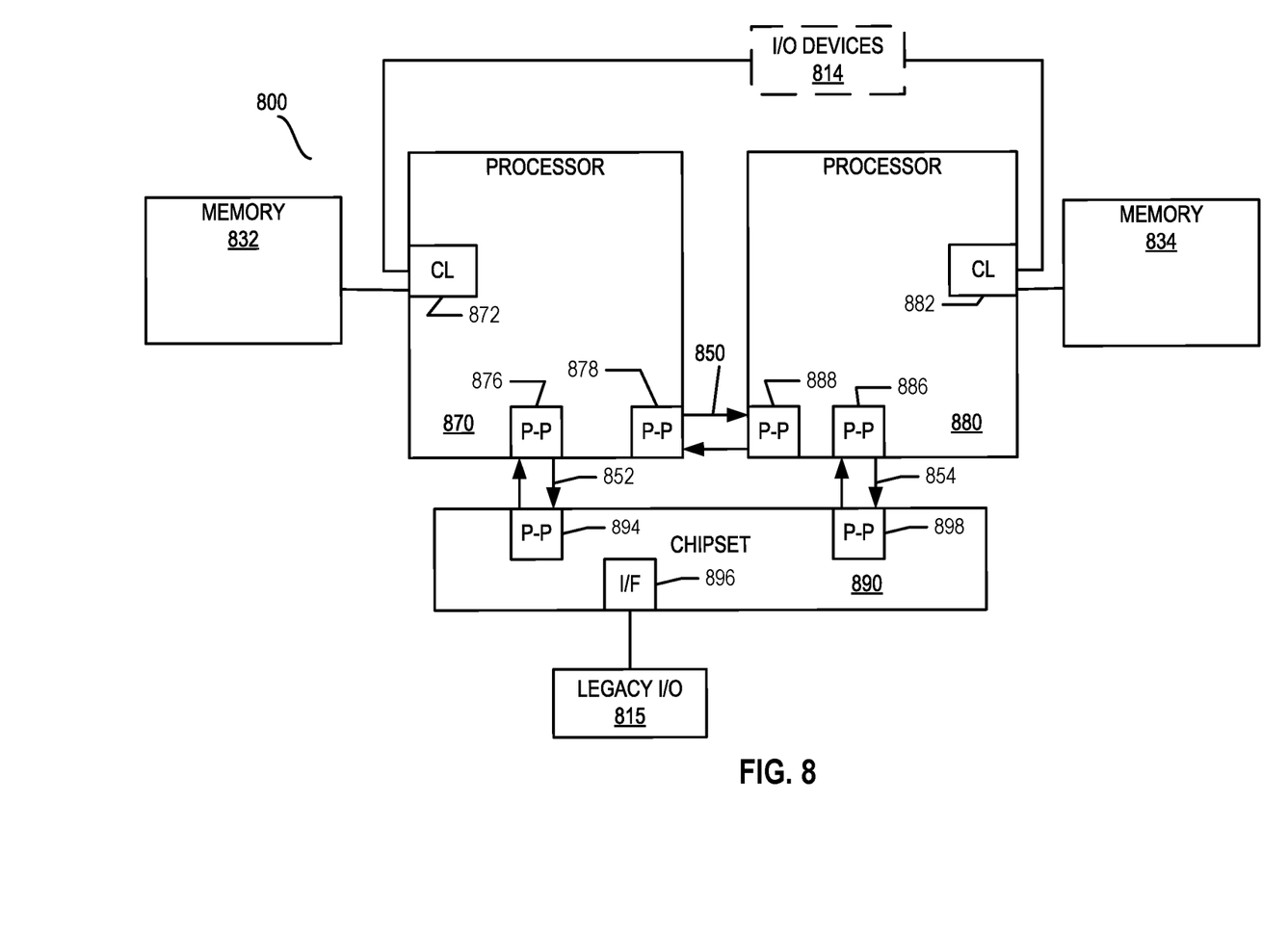
FIG. 8 shows a block diagram of a second more specific exemplary system 800 in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
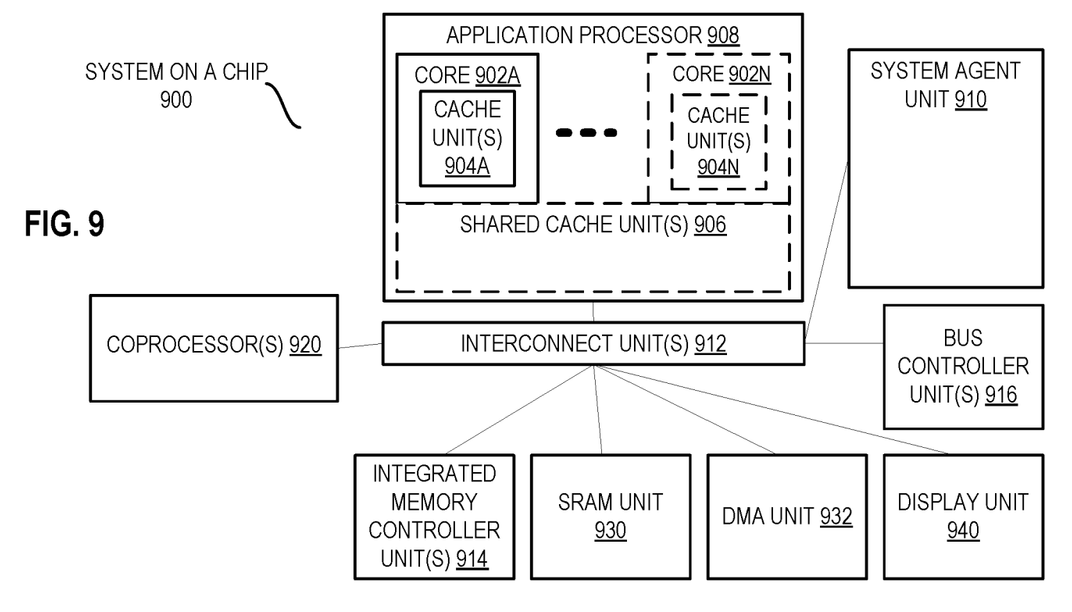
FIG. 9 shows a block diagram of a SoC 900 in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 912 is coupled to: an application processor 908 which includes a set of one or more cores 902A-N, which include cache units 904A-N, and shared cache unit(s) 906; a system agent unit 910; a bus controller unit(s) 916; an integrated memory controller unit(s) 914; a set of one or more coprocessors 920 which may include integrated graphics logic, an image processor, an audio processor, and a video processor; a static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion or purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Figure 10:
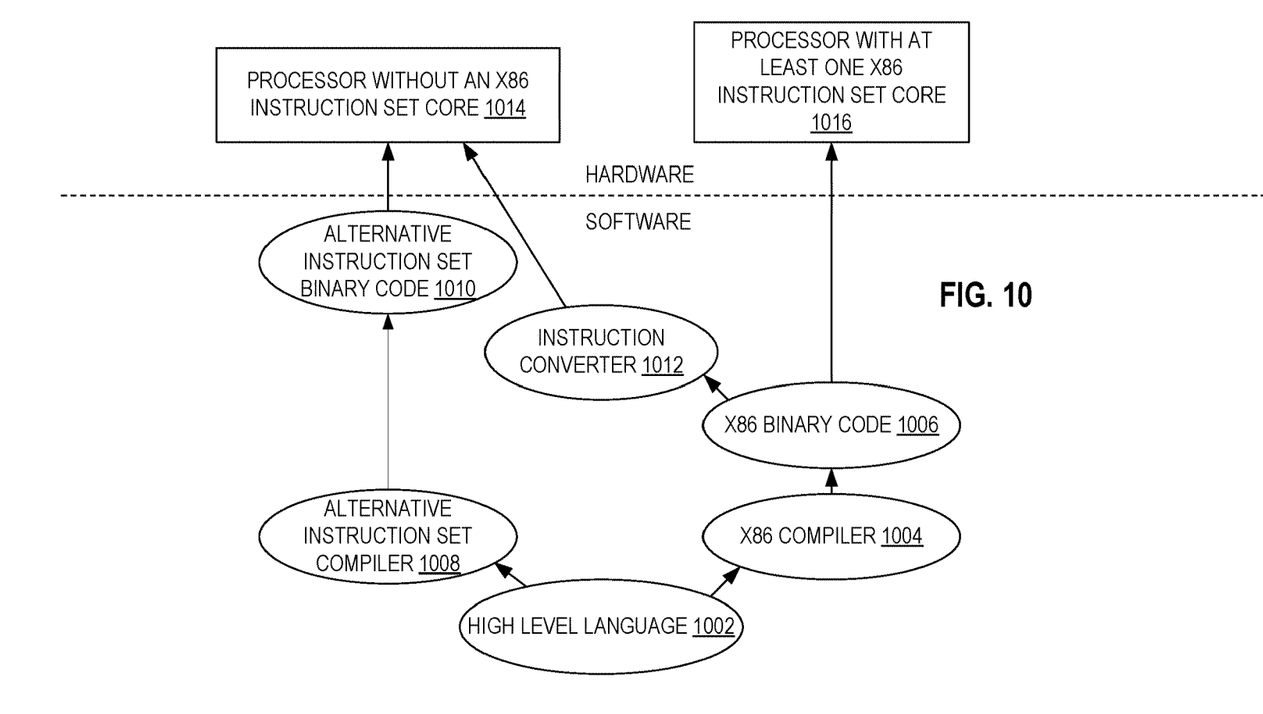
FIG. 10 shows a block diagram contrasting the use of a software instruction converter to convert binary instructions in a source instruction set to binary instructions in a target instruction set according to embodiments.

FIG. 10 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 10 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 10 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

What we claim is:

1. An apparatus comprising:
   an interrupt vector translation lookaside buffer (IVTLB) addressed by an interrupt number, each entry to store an interrupt service routine (ISR) address and a valid bit; and
   a processor core to respond to a received interrupt having one of a plurality of interrupt numbers by generating and sending an interrupt acknowledge (INTA) signal for the interrupt number to an interrupt controller, the interrupt controller to respond by sending an interrupt vector corresponding to the interrupt number and simultaneously causing the IVTLB to output an entry addressed by the interrupt number;
   wherein the processor core, when the valid bit of the IVTLB output is set, is to use the ISR address from the IVTLB output, and, otherwise, use the interrupt vector to walk an interrupt descriptor table to retrieve an interrupt descriptor, which is further used to walk a descriptor table to retrieve a segment descriptor, which is further used to calculate the ISR address, which is further stored at a corresponding IVTLB entry with the valid bit set, the processor core further to use the ISR address to execute the ISR.

2. The apparatus of claim 1, further comprising a selector to route either the interrupt vector or the IVTLB output to the processor core depending on the valid bit of the IVTLB output.

3. The apparatus of claim 1, wherein the processor core is to retrieve and execute microcode from a microcode storage.

4. The apparatus of claim 3, wherein the processor core is to execute the microcode at a ring-0 privilege level.

5. The apparatus of claim 1, wherein the received interrupt is received from one of P interrupt sources, and the IVTLB comprises a table with Q rows, wherein the valid bit of each of the Q rows is set to 0 after power-on or reset.

6. The apparatus of claim 5, wherein P equals Q, and the table has one row corresponding to each of the P interrupt sources.

7. The apparatus of claim 5, wherein P is larger than Q, and the processor core is further to select a sacrificial row of the IVTLB to overwrite with the address and valid bit.

8. The apparatus of claim 5, wherein each of the P interrupt sources is to route its interrupt to the interrupt controller, which is to generate the interrupt to the processor core.

9. An interrupt controller, comprising:
   an interrupt vector translation lookaside buffer (IVTLB) addressed by an interrupt number, having entries to each store an interrupt service routine (ISR) address and a valid bit;
   wherein the interrupt controller is to receive an interrupt acknowledge (INTA) signal from a processor core acknowledging receipt of an interrupt having one of a plurality of interrupt numbers, the interrupt controller to respond by sending an interrupt vector corresponding to the interrupt number to the processor core and simultaneously causing the IVTLB to output an entry addressed by the interrupt number; and
   wherein the processor core, when the valid bit of the IVTLB output is set, is to use the ISR address from the IVTLB output, and, otherwise, use the interrupt vector to walk an interrupt descriptor table to retrieve an interrupt descriptor, which is further used to walk a descriptor table to retrieve a segment descriptor, which is further used to calculate the ISR address, which is further stored at a corresponding IVTLB entry with the valid bit set, the processor core further to use the ISR address to execute the ISR.

10. The interrupt controller of claim 9, wherein the IVTLB comprises Q entries, wherein the plurality of interrupt numbers comprises P numbers, and wherein the received interrupt was generated by one of P interrupt sources.

11. The interrupt controller of claim 10, wherein P is larger than Q, and the processor core is further to select a sacrificial row of the IVTLB to overwrite with the address and valid bit.

12. The interrupt controller of claim 10, wherein the interrupt controller is further to apply a read address equal to P to the interrupt vector translation lookaside buffer.

13. The interrupt controller of claim 9, wherein data provided to the processor core in response to the INTA signal is selected using a selector to select the interrupt vector if an output of the IVTLB is invalid, and, otherwise, to select the output of the IVTLB.

14. A method of utilizing an interrupt vector translation lookaside buffer (IVTLB) as part of an interrupt scheme, the IVTLB comprising Q entries, with each entry corresponding to one of P interrupts, each of the Q entries comprising a valid bit and an extended instruction pointer (EIP), the method comprising:
   resetting the valid bit of each of the Q entries to 0 at power-on, or reset, or both;
   setting the valid bit of a selected one of the Q entries of the IVTLB;

setting the EIP of the selected one of the Q entries of the IVTLB; and providing the EIP of the selected one of the Q entries in response to a read request for the entry associated with the selected one of the Q entries and received by the IVTLB.

15. The method of claim 14, wherein P equals Q, the interrupt vector translation lookaside buffer has one row corresponding to each of P interrupt sources, and P can be used as an address to access the buffer.

16. The method of claim 14, wherein P is larger than Q, further comprising selecting a sacrificial row of the IVTLB to overwrite with the EIP and valid bit.

17. The method of claim 14, wherein P equals Q, further comprising reading an entry at address P of the IVTLB at substantially the same time as sending the interrupt vector to the processor core.

\* \* \* \* \*